UNITED STATES PATENT OFFICE.

FELIX RICHTER, OF FRANKFORT-ON-THE-MAIN, AND LUDWIG von ORTH, OF BERLIN, GERMANY.

PROCESS FOR PURIFYING AND BLEACHING WAX OF ALL KINDS.

1,072,035.  Specification of Letters Patent.  Patented Sept. 2, 1913.

No Drawing. Application filed September 28, 1910. Serial No. 584,282.

*To all whom it may concern:*

Be it known that we, FELIX RICHTER and LUDWIG VON ORTH, citizens of the German Empire, and residents of Frankfort-on-the-Main and Berlin, Germany, respectively, have invented certain new and useful Improvements in and Relating to Processes for Purifying and Bleaching Wax of All Kinds, of which the following is a specification.

Our invention relates to the purifying and bleaching of wax and consists in treating it with an aluminium oxid of a special origin. The said aluminium oxid is that obtained from aluminium amalgam, preferably by calcining the latter with admission of oxygen-containing gases, such as atmospheric air. This particular aluminium oxid has much higher absorptive power than those produced by other processes, for instance by heating trihydrate of aluminium. It has also a different physical structure, as appears from its low specific gravity, 0.25, the aluminium oxid produced by heating trihydrate of aluminium having a specific gravity of about 0.75 and other sorts have still higher specific gravities up to say 1.5.

A suitable method of producing the oxid is as follows: Aluminium amalgam in the form of small grains is exposed to atmospheric air or other oxygen-containing gases. Fiber-like extensions then form on the grains, substantially consisting of aluminium oxid. These extensions are separated from the residues not transformed to fibers, by sifting, and the fiber-material sifted off forms a very bulky substance of very small specific gravity. If these aluminium oxid fibers are then calcined, to drive off any mercury adhering thereto and to complete the transformation of the material to aluminium oxid, the resulting product has the specified low specific gravity of about 0.25. When wax of any desired origin, such for instance as bee's wax, ozokerite, ceresin, bitumen and other waxes, or wax- or resin-like substances of animal, vegetable and mineral origin are filtered through a layer of the said aluminium oxid whether in a molten or dissolved state, the dye stuffs and the impurities are absorbed by the filter to such an extent that a pure white product is obtained. When filtering in a molten state, it is advisable to heat the aluminium oxid before the beginning of the process and during the same, to a temperature beyond the melting temperature of the material to be purified, whereby the process of filtration is considerably facilitated.

In order to prevent the mass from trickling in an irregular manner through the layer of aluminium oxid, namely in order to prevent the material from passing along the walls, without the oxid having exercised sufficient action on it, it is advisable, when filtering wax in a molten state, which is preferably effected at the lowest possible temperature (about 10 to 15° C. above the melting point), to place a layer of ground glass or quartz over the aluminium oxid layer and also under the same. The process can be accelerated by employing pressure.

Instead of effecting the purification and bleaching of the substances named by filtration, they can also, more particularly when the conditions as to purity and color are less stringent, be treated by thoroughly mixing the material, also in a molten or dissolved state, with aluminium oxid for a long time, for instance for an hour, and then separating the purified product from the aluminium oxid by allowing it to settle or by a filtration process of any known kind.

As regards economy, the process has the advantage that losses of material are avoided, because practically only the impurities remain in the aluminium oxid, and the small quantities of wax can be recovered by extraction. The dirty aluminium oxid can again be regenerated by simple calcining, because it is not destroyed, as an oxid, by the calcining process.

What we claim is:

1. A process for purifying and bleaching wax of all kinds, including wax- and resin-like substances, consisting in treating the substances in divided condition with aluminium oxid obtained from aluminium amalgam.

2. A process for purifying and bleaching wax of all kinds, including wax- and resin-like substances, consisting in filtering the substances in divided condition through a layer of aluminium oxid obtained from aluminium amalgam.

3. A process for purifying and bleaching wax of all kinds, including wax- and resin-like substances, consisting in filtering the substances in divided condition through a heated layer of aluminium oxid obtained from aluminium amalgam.

4. A process for purifying and bleaching wax of all kinds, including wax- and resin-like substances, consisting in filtering the molten wax through a layer of aluminium oxid obtained from aluminium amalgam.

In testimony whereof I have signed this specification in the presence of two subscribing witnesses.

FELIX RICHTER.

Witnesses:
 JEAN GRUND,
 CARL GRUND.

In testimony whereof I have signed this specification in the presence of two subscribing witnesses.

LUDWIG von ORTH.

Witnesses:
 HENRY HASPER,
 WOLDEMAR HAUPT.